United States Patent
de Waal (10) Patent No.: US 8,061,290 B2
(45) Date of Patent: Nov. 22, 2011

(54) MECHANISM FOR A SLIDING ROOF

(75) Inventor: Martin de Waal, BC Kampen (NL)

(73) Assignee: Webasto AG, Stockdorf (DE)

( * ) Notice: Subject to any disclaimer, the term of this patent is extended or adjusted under 35 U.S.C. 154(b) by 228 days.

(21) Appl. No.: 12/566,832

(22) Filed: Sep. 25, 2009

(65) Prior Publication Data

US 2010/0077952 A1    Apr. 1, 2010

Related U.S. Application Data

(60) Provisional application No. 61/100,403, filed on Sep. 26, 2008.

(51) Int. Cl.
*B63B 19/14* (2006.01)
*B60J 7/047* (2006.01)

(52) U.S. Cl. ............... 114/201 R; 296/216.03; 296/223

(58) Field of Classification Search .................. 114/177, 114/201 R; 49/193; 296/118, 216.01, 216.03, 296/216.05, 221, 223, 224

See application file for complete search history.

(56) References Cited

U.S. PATENT DOCUMENTS

| | | | | |
|---|---|---|---|---|
| 4,678,228 | A * | 7/1987 | Boots | 296/216.03 |
| 5,058,947 | A * | 10/1991 | Huyer | 296/216.03 |
| 5,464,267 | A | 11/1995 | Racine et al. | |
| 6,547,319 | B1 * | 4/2003 | Huyer | 296/216.03 |
| 6,695,398 | B2 | 2/2004 | Racine et al. | |
| 7,178,862 | B2 | 2/2007 | Oechel et al. | |
| 2007/0210623 | A1 | 9/2007 | Becher et al. | |

FOREIGN PATENT DOCUMENTS

| | | |
|---|---|---|
| DE | 1933 991 A1 | 1/1971 |
| DE | 19833 934 B4 | 2/1999 |
| DE | 69925 619 T2 | 4/2006 |
| EP | 1586475 A2 | 10/2005 |
| EP | 1314 600 B1 | 5/2007 |

OTHER PUBLICATIONS

U.S. Appl. No. 61/100,403, filed Sep. 26, 2008.
EP Search Report for EP 2,168,798.
EP search opinion for EP 2,168,798.

* cited by examiner

*Primary Examiner* — Lars A Olson
(74) *Attorney, Agent, or Firm* — Fitch Even Tabin & Flannery; John M. Naber (57) ABSTRACT

An assembly for covering an opening of a vehicle, and particularly a boat, comprising a base frame having a pair of guide rails with a stop at a forward end and a continuous peripheral sealing surface; a movable panel slidably attached to the guide rails and configured to substantially cover the opening in a closed position, the panel having a sealing surface that substantially conforms to the base frame peripheral sealing surface in the closed position; the slidable panel attachment comprising a pair of mirror image slide assemblies on a front panel portion and a pair of mirror image rear brackets on a rear panel portion; the rear brackets being pivotably attached to the guide rails; and the slide assemblies having a panel raising mechanism comprising a drive slide and a locator disposed within guiderails, and a raising lever disposed between the drive slide and the guide rails and configured to raise the panel to an open position, a closing position, and a sealing position.

8 Claims, 12 Drawing Sheets

MECHANISM FOR A SLIDING ROOF

CROSS-REFERENCE TO RELATED APPLICATIONS/INCORPORATION BY REFERENCE

This patent application is related to and claims priority from provisional patent application No. 61/100,403, filed 26 Sep. 2008, entitled MECHANISM FOR A SLIDING ROOF, the contents of which are hereby incorporated herein by reference in their entirety for all purposes.

FIELD

The present invention generally relates to movable surfaces and specifically to a movable surface such as a lift and slide sunroof that provides a sufficient seal in a closed position suitable for marine applications.

BACKGROUND

It is common knowledge to provide a movable surface, such as a sunroof, to cover an opening in a roof, including vehicles such as automobiles. Traditional sunroofs typically employ a transparent glass pane slidable from a covering position, somewhat flush to the roof, to a retracted position, which allows sunlight and/or ventilation access through the roof opening.

Although many vehicle movable surfaces retract into the interior of the vehicle, it is also known in the art to provide sunroofs that lift and slide to an open position on the exterior of the vehicle. These can be referred to as "spoiler" sunroofs and are described generally at U.S. Pat. Nos. 5,464,267 and 6,695,398 to Racine et al. of Webasto Sunroofs, Inc. of Rochester Hills, Mich., both incorporated by reference herein. A typical spoiler-type sunroof is capable of moving between a closed position, wherein the sunroof panel substantially seals the opening in the roof, a vent position wherein the panel is angled relative to the roof such that a rearward (and in some cases forward) end of the panel is disposed above the roof, and an open position wherein the sunroof panel is disposed substantially rearward of the opening. Specifically, a typical spoiler sunroof includes a pair of tracks on each of which is mounted a lift arm and lift mechanism. The lift arms are connected to the panel and are operatively connected to the lift mechanism so that the lift arms may be pivoted about a forward pivot point. This design requires the panel to be supported in a somewhat cantilevered manner, since all but a forward portion of the sunroof panel is disposed behind the opening when the panel is in the open position.

Given these design constraints, typical spoiler-type sunroof mechanisms have tended to be somewhat complicated to effect the desired panel movement. Additionally, as the sunroof panels are deployed above the roof in the vent and open positions, there is a relatively large force directed onto the panel when the vehicle, such as an automobile, is moving due to wind resistance on the panel. Therefore, the mechanisms to support the panel need to be relatively strong to support the panel in a stable manner and resist deflection of the mechanism and possible damage to the mechanism itself and/or the panel.

Movable surfaces are also known in the art for marine applications. Marine vehicles (e.g., boats) and the marine environment can pose a different set of design and engineering challenges compared to land-based vehicles. Boats can be quite large and thus allow the possibility for very large movable surfaces in the form of hatches, sunroofs, or even large sections of its deck surfaces (e.g., 3 meters by 3 meters). Also, since these movable surfaces can be exposed to extreme weather and water conditions, it is necessary to provide a weather tight seal in a closed position to prevent leakage. Simple marine sunroofs are known in the art, but are not suited for a tight seal against the elements. For example, a sliding roof hatch is known, such as the one sold by ERTEC of Denmark. This hatch is a simple marine hatch that slides along a fixed track and has a braking mechanism to lock the hatch into a desired position. The ERTEC hatch offers no significant protection from marine conditions. This is also true of a hard bimini top type sunroof, such as one sold by BESENZONI of Italy. BOFOR of Turkey also produces marine hatches. Here again, a sunroof is movable along a simple fixed track. In these instances it appears the hatches, in a closed position, are not intended to seal an interior space from the marine environment.

Further, movement of large movable surfaces can also add to design challenges, especially given the crown (or 'bow-up') of various marine roof decks. A mounting bracket for a large moveable surface may have to change its orientation between the deck and surface along its travel path. Further, the need to motorize the movement of the surface also increases with surface size.

Thus, there is a desire and a need in the art to provide a motorized movable roof surface suitable for the marine environment that provides a sufficient seal in a closed position to protect an interior space from marine elements and allows flexible mounting of the movable surface along its travel.

SUMMARY

Accordingly, the present invention provides a movable surface such as a lift and slide sunroof that provides a sufficient seal in a closed position suitable for marine applications. This is accomplished using a mechanism that allows an open position, a closed position, and a sealed position. The embodiments shown can be used for very large movable surfaces (e.g., 3 meters by 3 meters), and can accommodate to irregular or crowned surfaces such as bowed deck surfaces.

One embodiment provides an assembly for covering an opening of a vehicle, and includes a base frame having a pair of mirror image guide rails with a stop at a forward end and a continuous peripheral sealing surface; a movable panel slidably attached to the guide rails and configured to substantially cover the opening in a closed position and rearwardly movable above a vehicle roof to an open position, the panel having a sealing surface that substantially conforms to the base frame peripheral sealing surface in the closed position; the slidable panel attachment comprising a pair of mirror image slide assemblies on a front panel portion and a pair of mirror image rear brackets on a rear panel portion; the rear brackets being pivotably attached to the guide rails; and the slide assemblies having a panel raising mechanism comprising a drive slide slidably disposed within the guiderails, a locator fixed within the guiderails, and a raising lever disposed between the drive slide and the guide rails, wherein the locator is configured to raise the panel to an open position and a closing position, and the drive side configured to move the panel to a sealing and an unsealing position.

One embodiment provides a first and second slide channel within the drive slide, a locator channel within the locator, and the raising lever having a first slide shaft slidably retained within the drive slide first channel and the locator channel, wherein the position of the shafts within the channels orients the raising lever to an open position along the drive slide travel within the guide rail, between an open position to a closed position along the first slide shaft travel within the locator channel, and to a sealing position along the first slide shaft travel along the first drive slide channel. In alternate embodiments, the locator can be slidably disposed within the guiderail and a stop provided to prohibit further travel of the movable surface and to initiate the closing and sealing sequence.

An optional feature can include a drive cable connected to the slide assemblies to allow a motive force connected to the drive cable to actuate movement of the panel.

An additional optional feature can include mounting the panel to the slide assembly by a pivoting joint or ball and socket joint and allow up to about 23 degrees of deflection of the roof panel.

Other features will become more apparent to persons having ordinary skill in the art to which the antimicrobial pertains and from the following description and claims.

BRIEF DESCRIPTION OF THE FIGURES

The foregoing features, as well as other features, will become apparent with reference to the description and Figures below, in which like numerals represent elements and in which.

DETAILED DESCRIPTION OF THE INVENTION

The present invention generally relates to movable surfaces and specifically to a movable surface such as a lift and slide sunroof that provides a sufficient seal in a closed position suitable for marine applications. Additionally, the present invention also provides improved vessel light and ventilation.

The present invention allows for a greater variety of motorized movable surfaces than is known in the art, while allowing for a seal sufficient to handle the marine environment in its closed position. The present invention can accommodate movable surfaces up to three by three meters and a variety of curvatures (crowns, 'bow-ups') to a boat deck, both across its beam and its length. This allows for retrofitting existing deck surfaces as a hatch or flush-mounted to the level of the deck.

The movable surface (hereinafter, roof panel) can be made from a variety of materials, limited by the design of the marine vessel, and can include glass, acrylic, glass reinforced plastic (GRP), other fiberglass compositions, carbon fiber, wood, aluminum, and the like. Where the roof panel application is transparent, a sunblind (not shown), can also be applied. Other features of the present invention include the ability to design for very large openings, a watertight seal in a closed position, easy installation, cross curvature possibility and use of non-corrosive materials.

The present invention provides a simplified sliding mechanism that allows a roof panel to travel along a guide to a lift and slide movement. The use of a substantial locator, and a lever and driving slide moving within the guide allows the desired positioning of the sunroof in all positions while allowing the roof to be sealed from the weather to suit the demands of a marine design. This is shown, with particularity, in the attached drawings and discussed presently.

Figure 1:
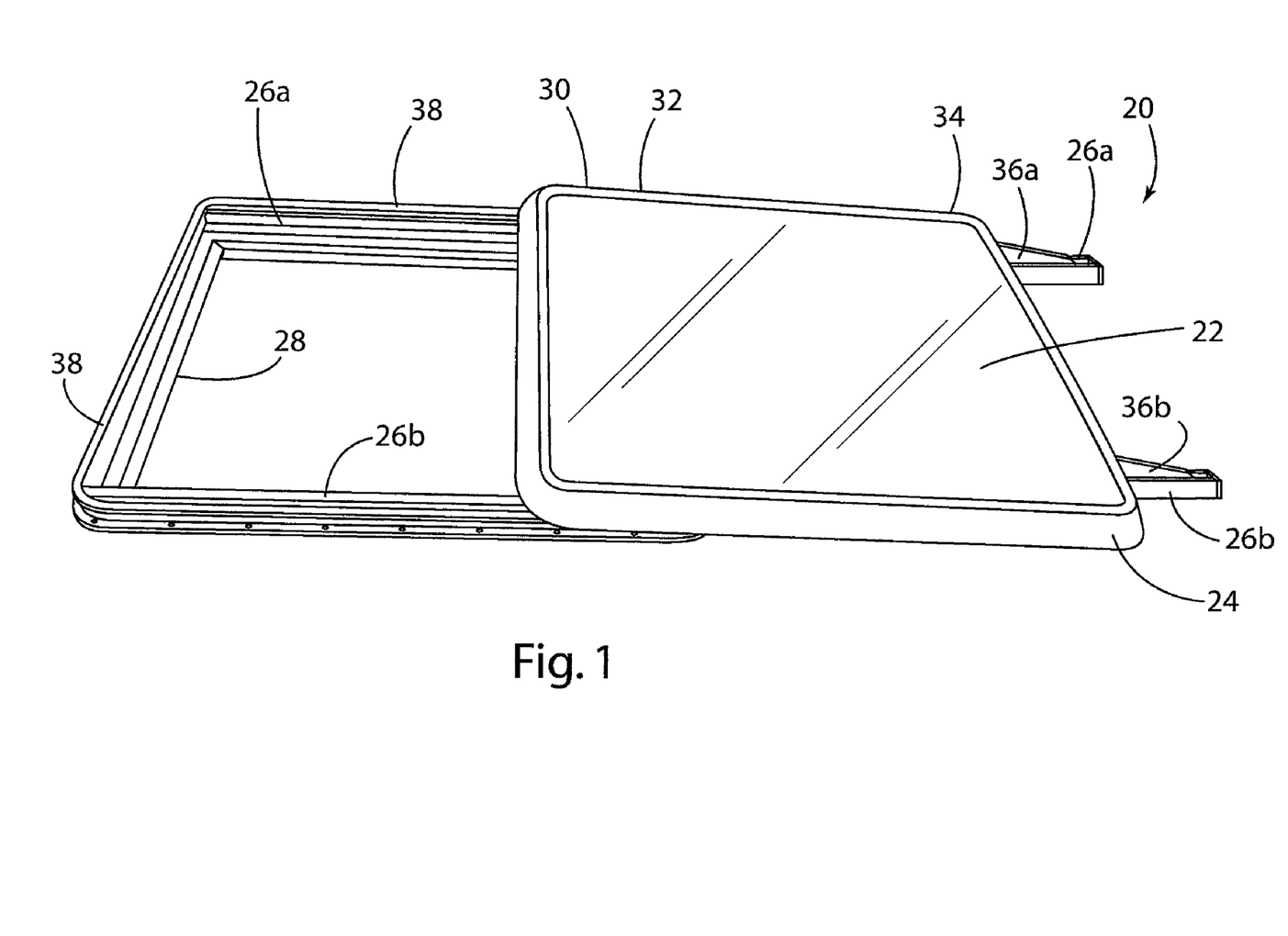
FIG. 1 is a perspective view of a sliding roof assembly according to the principles of the present invention.
Figure 8A:
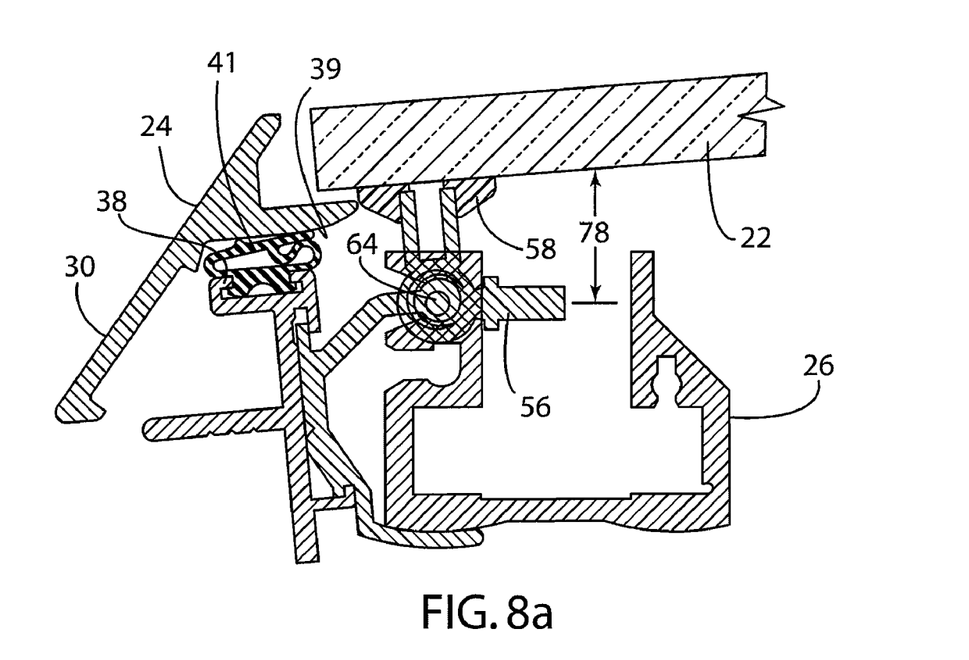
FIGS. 8a and 8b are cross sectional views, taken along line 8-8 of FIG. 2, showing an attached sunroof in at right angles (8b) and at a slight increased angle (8a) to the sliding roof guide according to the principles of the present invention.
Figure 8B:
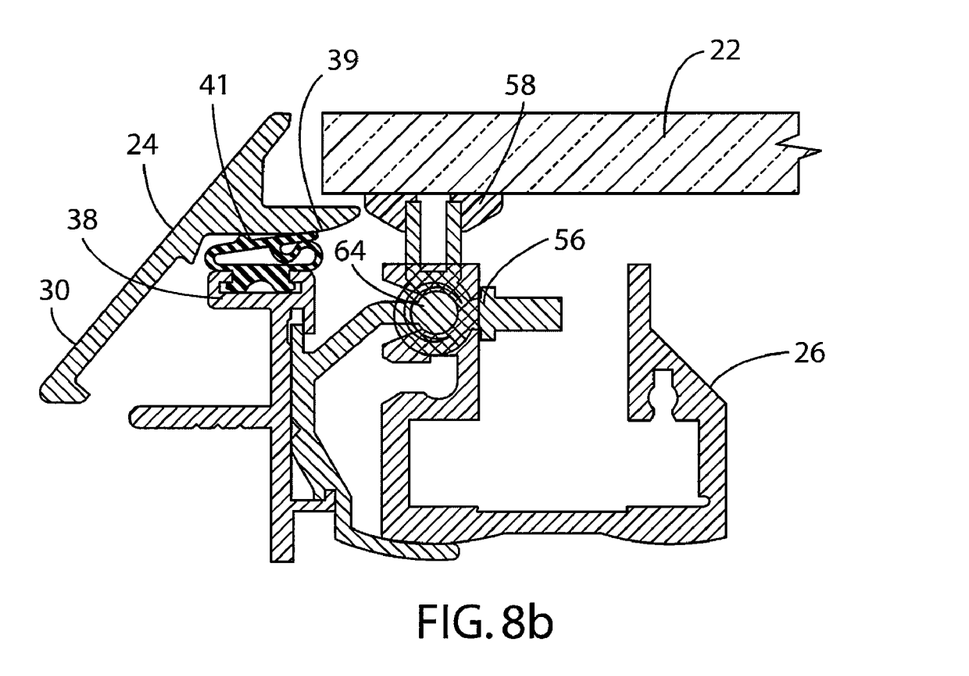

Turning now to the Figures, FIG. 1 shows a perspective top view of a sliding roof assembly according to the principles of the present invention and is generally indicated at 20 and is shown in an open position. As shown, sliding roof 20 covers an opening of a vehicle, and particularly a marine vehicle such as a boat, has a base frame 28 and mirror image guide rails 26a and 26b. Guides 26 are mounted substantially parallel to each other, spaced a width needed to mount a roof panel assembly 30 and at a length to travel a roof panel assembly 30 to a desired fully opened position (rearward as shown), and may be flat or curved depending on the deck surface of the vessel. Roof panel assembly 30 can have a transparent roof panel 22 and can be held in place by a roof panel frame 24. As discussed above, many types of roof panel configurations and materials are possible. As illustrated, roof panel assembly 30 can be attached to sliding roof 20 along guides 26a and 26b along a front portion 32 and a rear portion 34. As shown in FIG. 1, rear roof panel portion 34 is pivotally attached to guides 26 by a pair of mirror image brackets 36a and 36b, which are attached to roof panel frame 24. Base 28 also has a continuous peripheral sealing surface 38 that substantially conforms to a corresponding continuous sealing surface of roof panel 22 (shown at 39 on FIG. 8).

Interposed between the sealing surfaces can be a weather-strip seal (shown at 41 in FIG. 8) attached at either sealing surface. The amount of weatherproofing available to the sliding roof 20 in a closed position can be a function of the strength of the closure and the conformity of the sealing surfaces. The present invention provides conforming sealing surfaces 38 and 39 so that, in combination with weather-strip 41 and the closure mechanism, a weather tight seal is formed to allow use in a marine environment.

Figure 2:
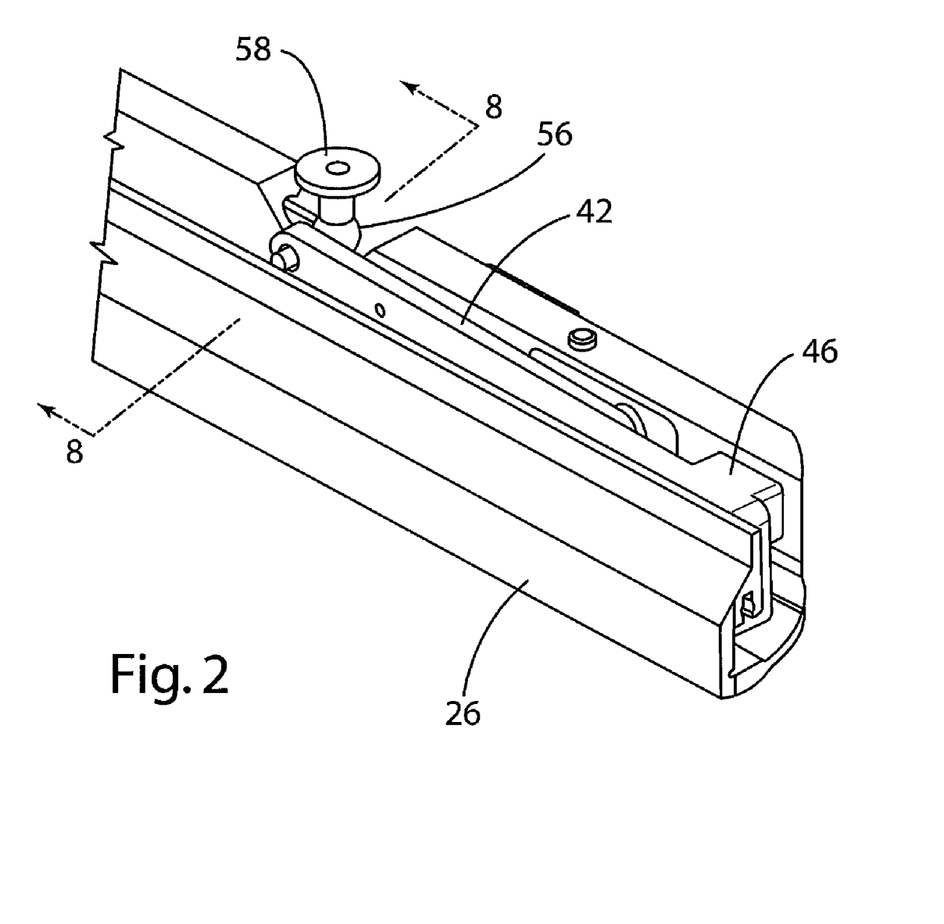
FIG. 2 is a perspective view of a slide assembly within the guide of a sliding roof according to the principles of the present invention.
Figure 3:
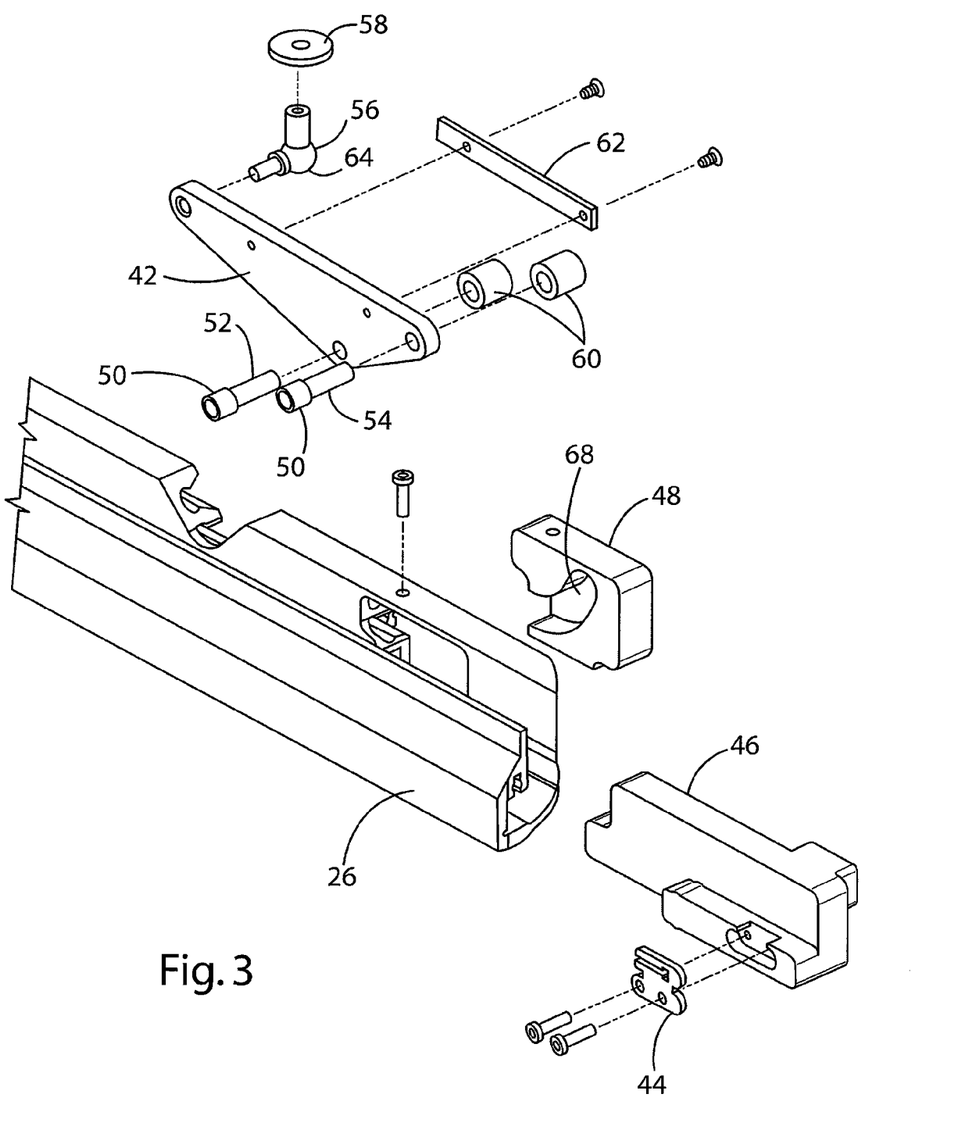
FIG. 3 is an exploded perspective view of a slide assembly within the guide of a sliding roof according to the principles of the present invention.

FIGS. 2 and 3 illustrate more detail to guide 26 and the front portion attachment assemblies. The front portion attachment assemblies are a pair of slide assemblies 40 between guide 26 and roof panel 22. Please note that two driving slide assemblies are present in the current invention, though only one is shown. The opposite guide assembly is a substantially similar mirror image of the assembly described. It is also noted that although these assemblies are shown for the front portion of the panel, they can also be configured to attach to the rear portion of the panel and still be within the scope of the invention. The same is, of course, true for the rear brackets as well. They could, if needed, be attached to the front portion of the panel assembly.

As shown in FIGS. 6 and 7, as roof panel assembly 30 travels from a closed position (6a and 7a) to an open position (6d and 7d), slide assembly 40 actuates a lever 42 to raise roof panel assembly 30 to release the weatherproof seal and continue to raise to a point high enough above continuous seal 38 to allow rearward motion. Pivoting rear brackets 36 allow the roof panel assembly 30 to rise at one end. Slide assembly 40 can be urged in a forward and rearward direction by a cable or strap (not shown) using known technology. The described embodiment can be motorized, though manual movement of slide assembly 40 would also fall within the scope of the invention.

Figure 4:
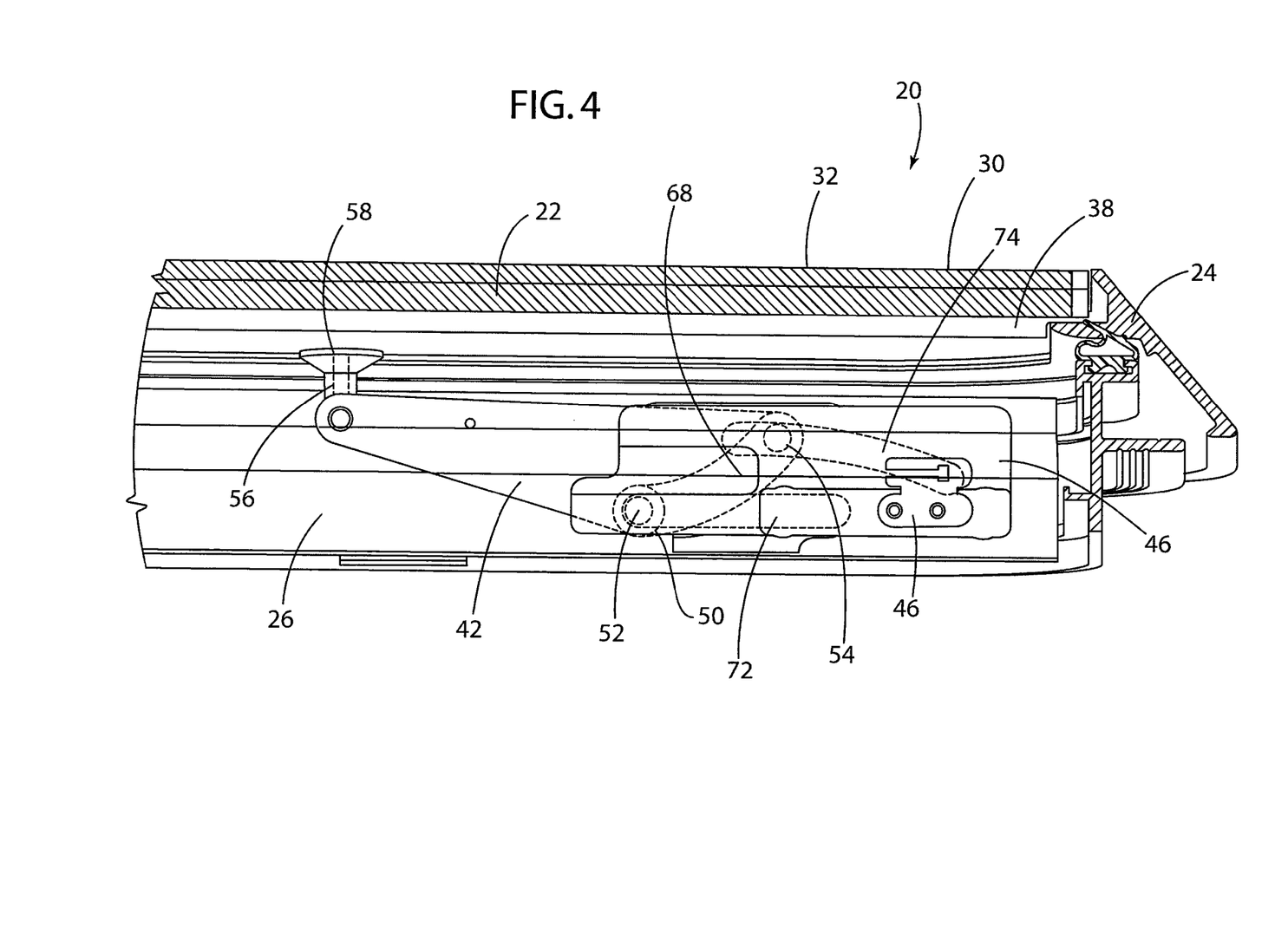
FIG. 4 is a side view of a sliding roof assembly according to the principles of the present invention in a closed position.
Figure 5:
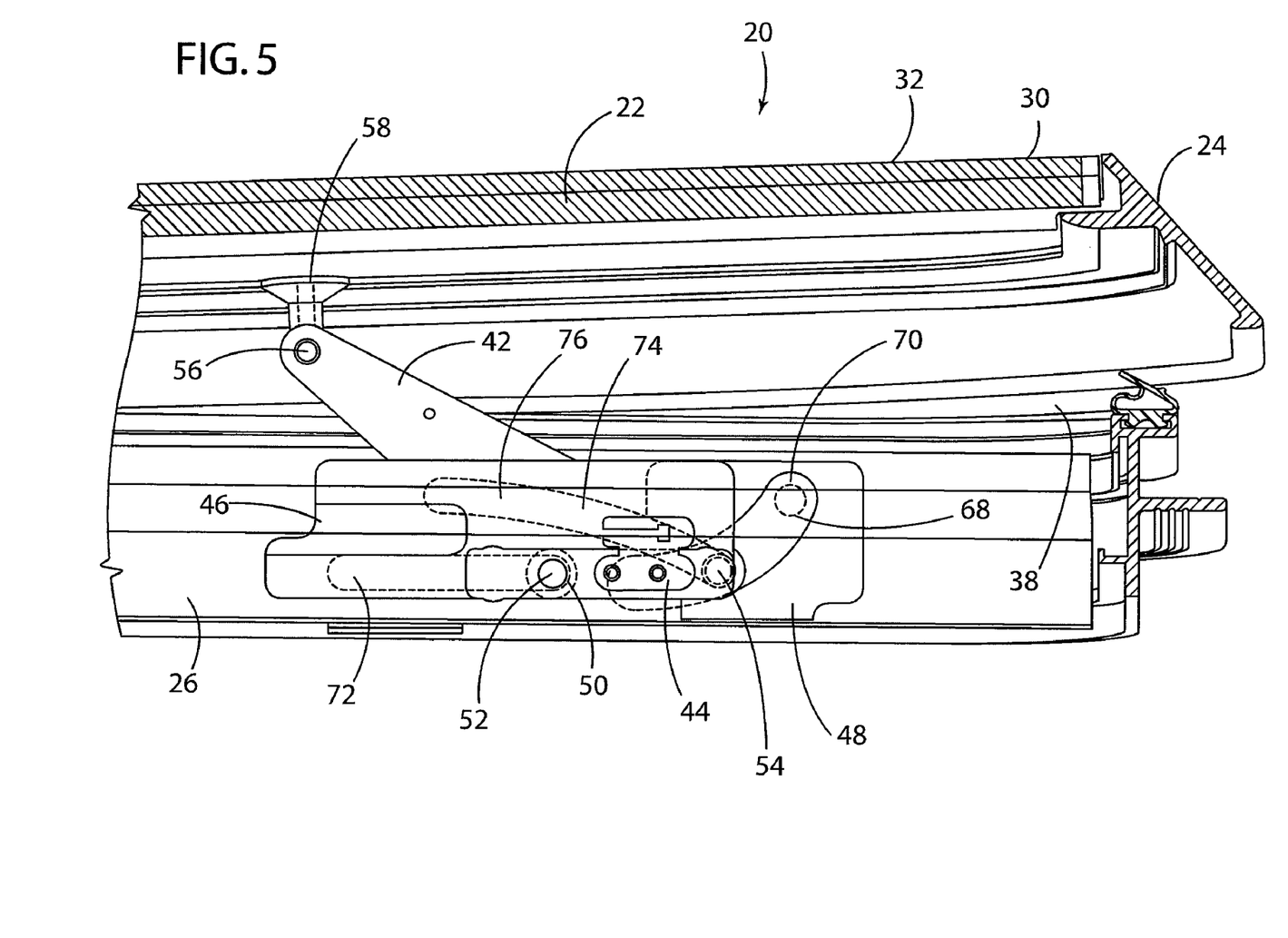
FIG. 5 is a side view of a sliding roof assembly according to the principles of the present invention in a tilt or vent position.
Figure 6A:
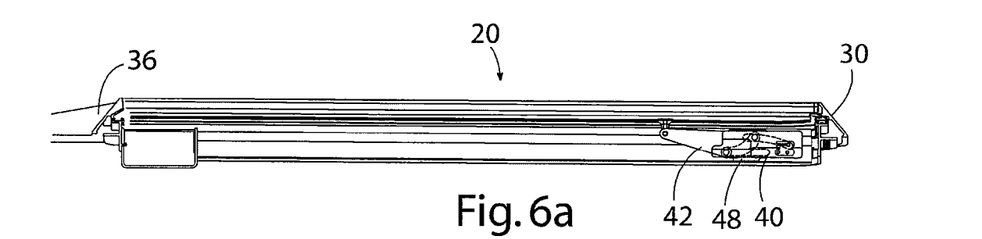
FIGS. 6a-6d are partial side views of a sliding roof assembly according to the principles of the present invention in a sequence showing a closed position (6a), a vent or tilt position (6b), a half open position (6c), and a fully open position (6d).
Figure 6B:
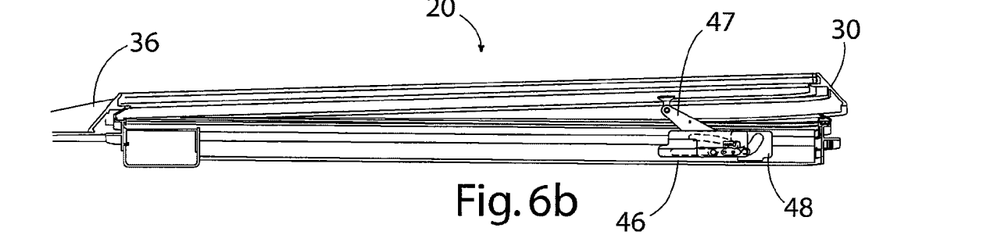
Figure 6C:
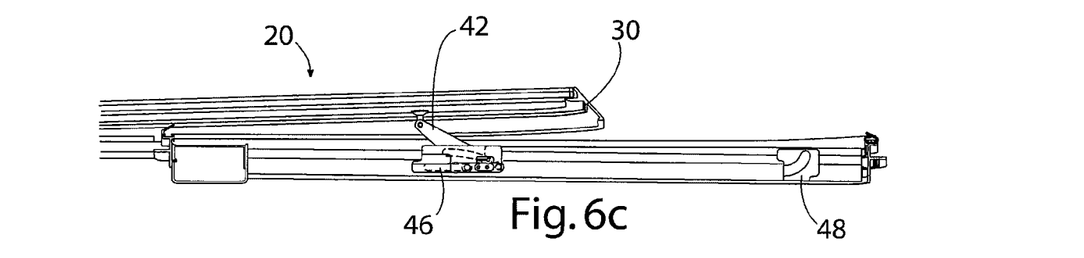
Figure 6D:
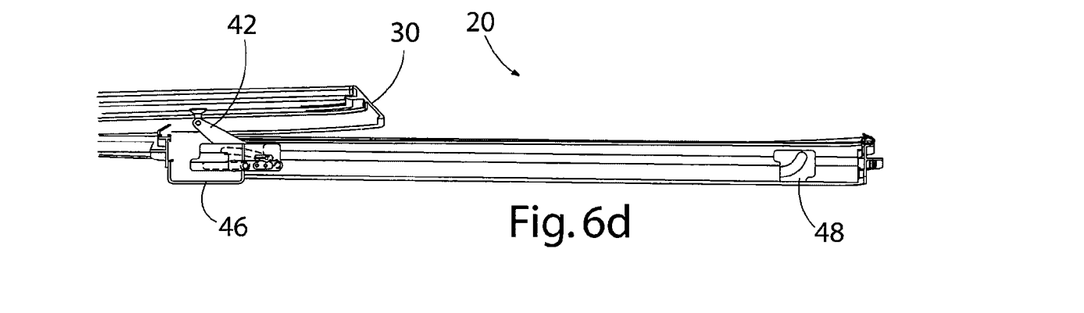
Figure 11:
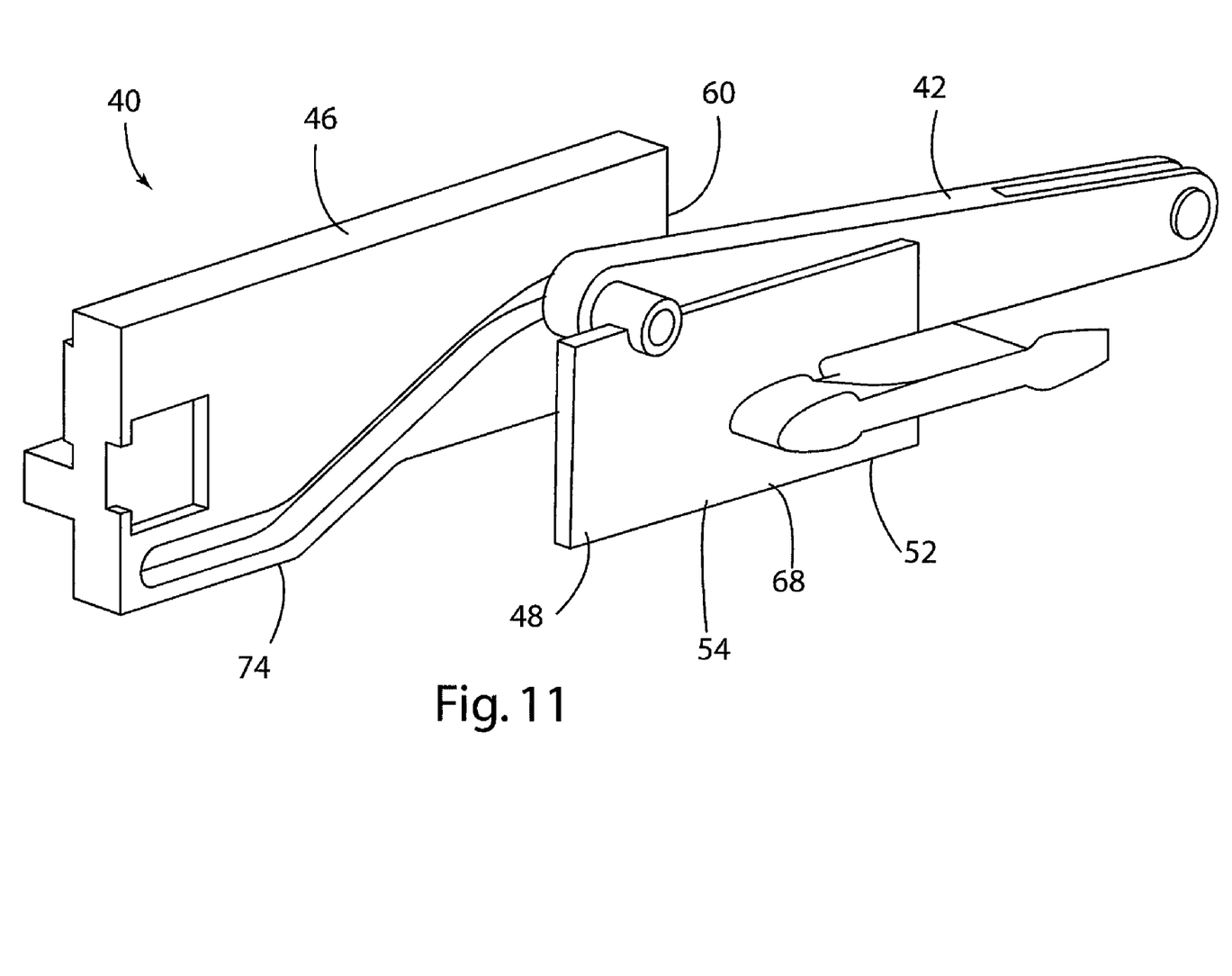
FIG. 11 is a perspective view of an alternate embodiment of a driving slide according to the principles of the present invention.
Figure 12:
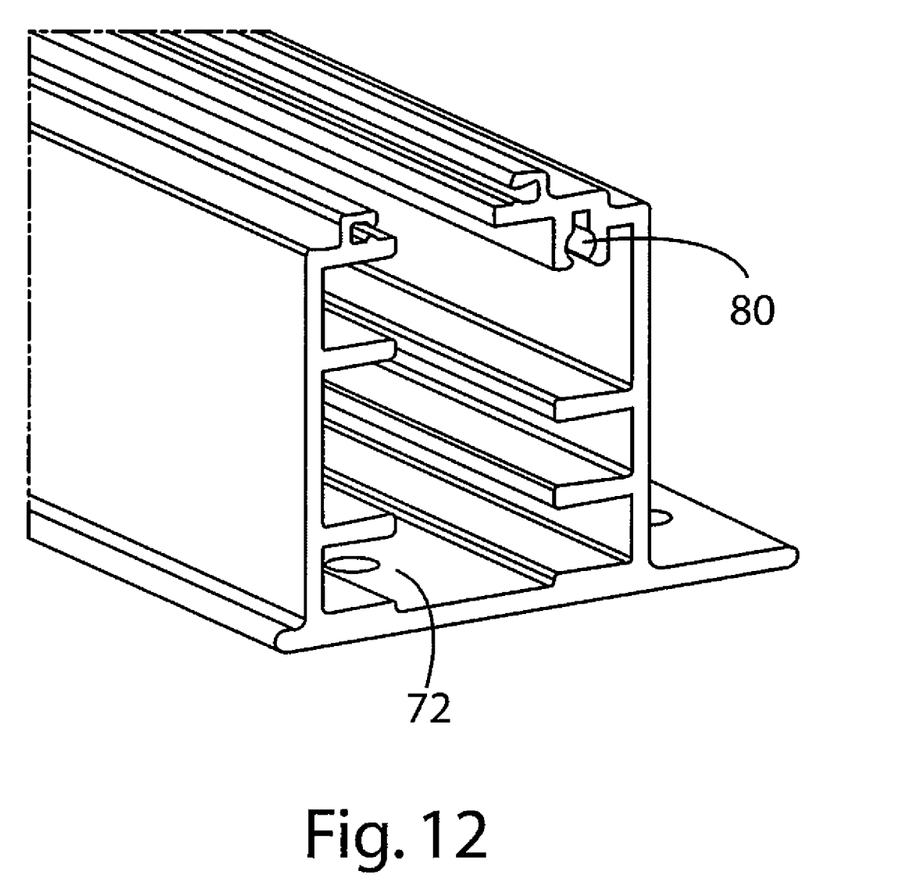
FIG. 12 is a perspective cutaway view of a driving slide channel according to the principles of the present invention.

As shown in FIGS. 2, 3 and 11 (as an alternate embodiment), slide assembly 40 can have drive cable holder 44 (disposed in slot 80 as illustrated in FIG. 12), a driving slide 46 (shown in more detail in FIG. 9), a locator 48, bearing bushings 50, shafts 52 and 54, an angular joint 56, a mounting flange support 58, a lever wheels 60, and sliding plate 62. Locator 48 functions to position the roof panel 22 from a closed (FIG. 4) position to an open position (FIG. 5), while driving slide 46 functions to position roof panel 22 along its travel path to an open position (FIG. 7d) to a vent position (FIG. 7b) and once a closed position is reached, to go from a sealed position (FIG. 4) to an unsealed position (FIG. 5).

Figure 10:
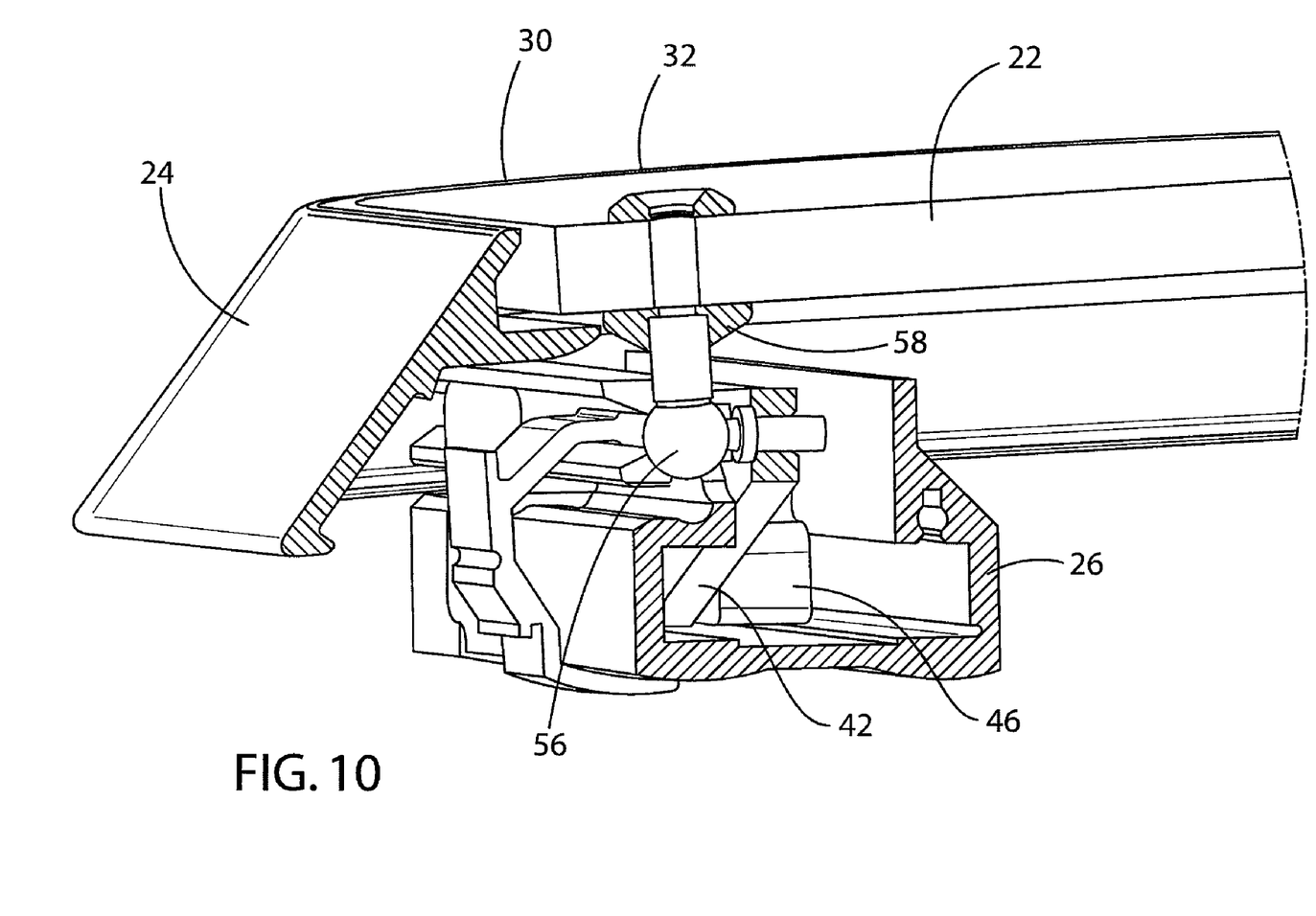
FIG. 10 is a perspective cutaway view of a driving slide within the guide of a sliding roof according to the principles of the present invention.

As shown in FIGS. 8a and 8b, angular joint 56 allows varying angles of attachments between slide assembly 40 and roof panel assembly 30 without modification. In this instance, slide assembly 40 is attached to roof panel 22 through a mounting flange support 58. As shown at dimension 78, there can be up to 22.4 degrees of deflection of roof panel 22. This is particularly valuable to allow a vessel's deck designer to maintain continuity of the deck lines, even when there is a crown (curve) on the deck along its length or its beam. Further, a ball and socket embodiment (FIG. 10) attachment to roof panel 22 can allow deflection on several axes and can vary even along its travel path.

Figure 7A:
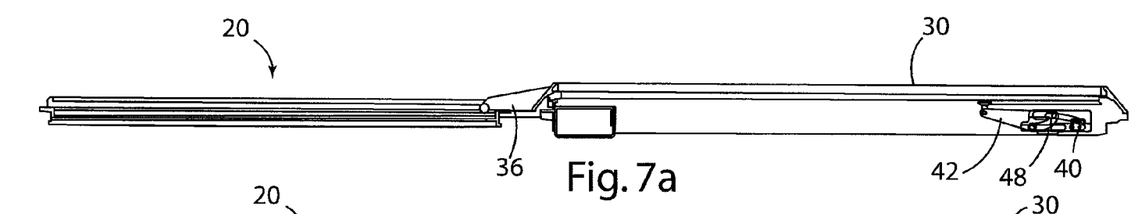
FIGS. 7a-7d are full side views of a sliding roof according to the principles of the present invention in a sequence showing a closed position (7a), a vent or tilt position (7b), a half open position (7c), and a fully open position (7d).
Figure 7B:
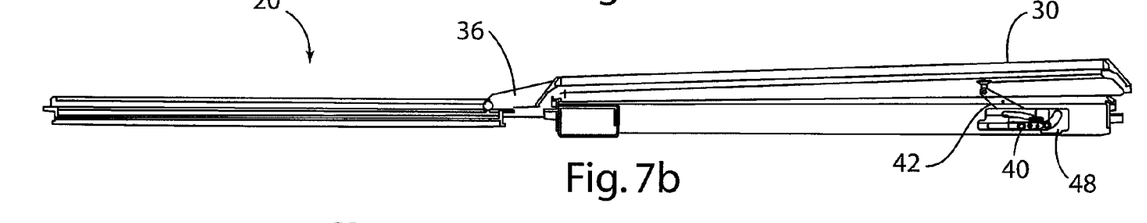
Figure 7C:
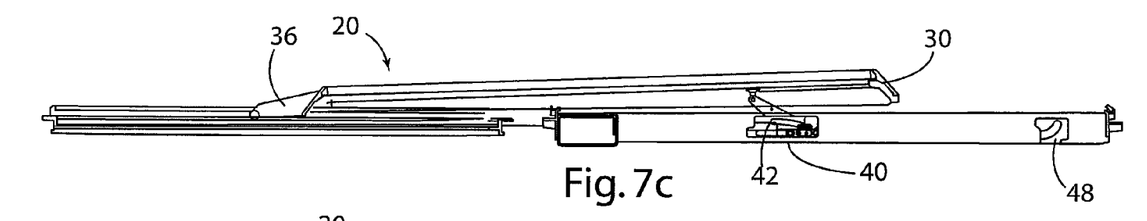
Figure 7D:
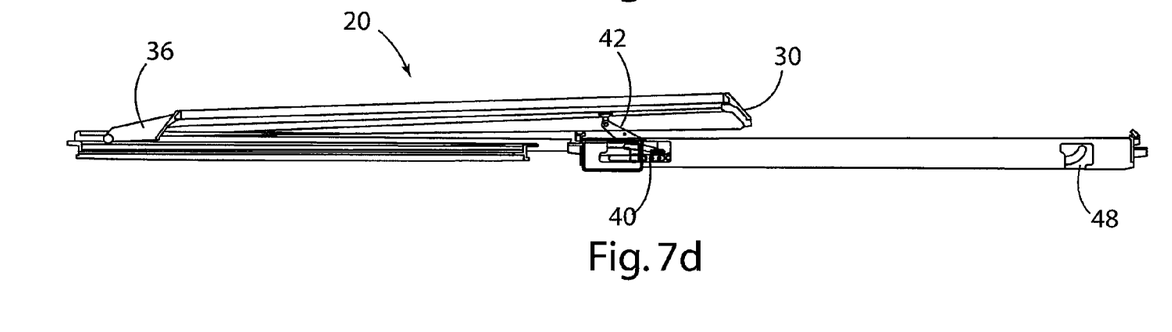
Figure 9:
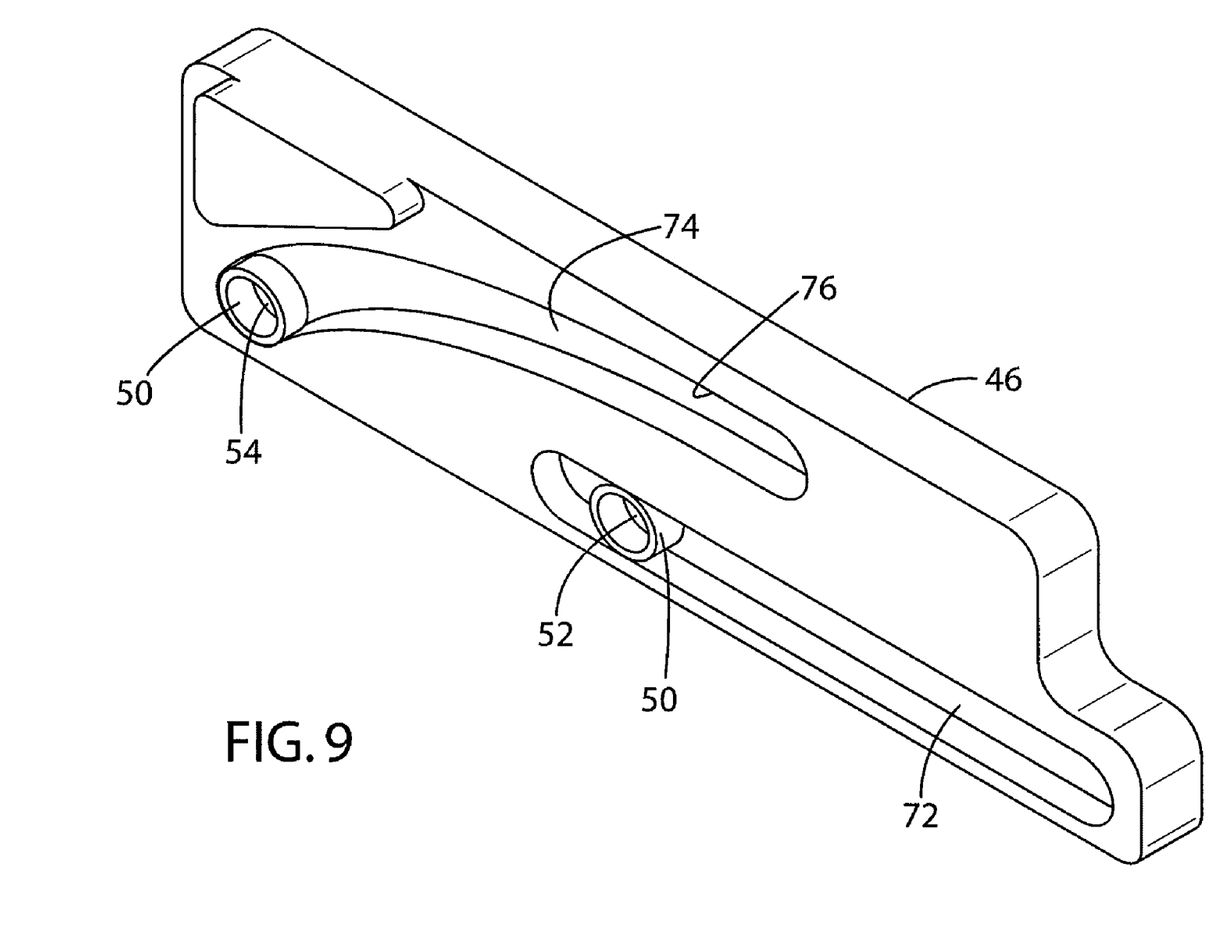
FIG. 9 is a side view of the driving slide of the sliding roof according to the principles of the present invention.

Returning to FIGS. 4 and 5, shown are the two extreme positions of the actuating (raising) lever 42 of slide assembly 40 from a closed and sealed position (FIG. 4) to an open position (FIG. 5). Please note that the raised position of lever 42 is maintained throughout its travel along guide 26 until slide assembly 40 reaches the end of its travel and the roof panel 22 is in a fully open position (as shown in FIG. 7d). It is noted that as illustrated, the end of travel of the roof panel assembly 30 is defined by the fixed position of locator 48 within the guiderail. In embodiments where locator 48 is configured to travel with driving slide 46, a stop could be added to determine the end of travel. When slide assembly 40 is activated to move towards a closed position, lever 42 also remains raised until shaft 54 reaches locator 48 at a forward end of the guide rail 26 and driving slide 46 is allowed to continue forward. At this point, lever 42 is held in position relative to the position of shaft 52 disposed within locator slide channel 68 and driving slide 46, channels 52 and 54, as illustrated. FIG. 9 shows a reverse view of the opposite driving slide 46 to show channels 52 and 54 more clearly.

As illustrated, locator 48 can be held stationary within guide 26, and as driving slide 46 continues its forward travel to a closed and sealed position, the orientation of shafts 52 and 54 change within the channels. Locator 48 prevents movement of the roof panel along the guide rails while closing. Shaft 52 serves as the pivot point for lever 42 as it travels along driving slide 46, channel 72 maintaining the same height orientation. As travel continues, channel 68 causes lever 42 to lower roof panel assembly 30 flush with continuous seal 38. Once shaft 54 travels along channel 68 and is terminated at position 70, driving slide 46 continues forward, changing shaft 54's orientation to a tighter seal as shaft 54 approaches the termination of channel 74 at position 76. At this point, lever 42 is forced downward in a gradual and smooth motion to provide a weatherproof seal between base 28 and roof panel assembly 30. It is noted that the materials to make slide assembly 40 and its components and the force used to actuate its movement can be established using sound engineering practices, with attention to the desired degree of seal. It is noted that in alternate embodiments, the locator can be slidably disposed within the guiderail and travel with the driving slide and lever 42. One advantage of locator 48 being held stationary is the ability to extend the locator channel, the length of the guiderail, and to allow the locator to be built to a stronger tolerance and size to better accommodate marine stresses.

While the invention has been described in conjunction with specific embodiments, it is evident that many alternatives, modifications, and variations will be apparent to those skilled in the art in light of the foregoing description. Accordingly, the present invention attempts to embrace all such alternatives, modifications, and variations.

The invention claimed is:

1. An assembly for covering an opening of a vehicle, comprising:
    a base frame having a pair of mirror image guide rails with a stop at a forward end and a continuous peripheral sealing surface;
    a movable panel slidably attached to the guide rails and configured to substantially cover the opening in a closed position and rearwardly movable above a vehicle roof to an open position, the panel having a sealing surface that substantially conforms to the base frame peripheral sealing surface in the closed position;
    the slidable panel attachment comprising a pair of mirror image slide assemblies on a front panel portion and a pair of mirror image rear brackets on a rear panel portion;
    the rear brackets being pivotably attached to the guide rails; and
    the slide assemblies having a panel raising mechanism comprising a drive slide slidably disposed within the guiderails, a locator fixed within the guiderails, and a raising lever disposed between the drive slide and the guide rails, wherein the locator is configured to raise the panel to an open position and a closing position, and the drive slide configured to move the panel to a sealing and an unsealing position.

2. The assembly of claim 1, further comprising a first and second slide channel within the drive slide, a locator channel within the locator, and the raising lever having a first slide shaft slidably retained within the drive slide first channel and the locator channel, wherein the position of the shafts within the channels orients the raising lever to an open position along the drive slide travel within the guide rail, between an open position to a closed position along the first slide shaft travel within the locator channel, and to a sealing position along the first slide shaft travel along the first drive slide channel.

3. The assembly of claim 1, further comprising a drive cable connected to the slide assemblies to allow a motive force connected to the drive cable to actuate movement of the panel.

4. The assembly of claim 1, wherein the panel is mounted to the slide assembly by a pivoting joint.

5. The assembly of claim 4, wherein the pivoting joint allows up to about 23 degrees of deflection of the roof panel.

6. The assembly of claim 1, wherein the panel is mounted to the slide assembly by a ball and socket joint.

7. A marine vehicle having an opening and a sunroof assembly, comprising:
- a base frame having a pair of mirror image guide rails with a stop at a forward end and a continuous peripheral sealing surface;
- a movable panel slidably attached to the guide rails and configured to substantially cover the opening in a closed position and rearwardly movable above a vehicle roof to an open position, the panel having a sealing surface that substantially conforms to the base frame peripheral sealing surface in the closed position;
- the slidable panel attachment comprising a pair of mirror image slide assemblies on a front panel portion and a pair of mirror image rear brackets on a rear panel portion;
- the rear brackets being pivotably attached to the guide rails; and
- the slide assemblies having a panel raising mechanism comprising a drive slide slidably disposed within the guiderails and a locator fixed within the guiderails, and a raising lever disposed between the drive slide and the guide rails, wherein the locator is configured to raise the panel to an open position and a closing position, and the drive slide configured to move the panel to a sealing and an unsealing position.

8. An assembly for covering an opening of a vehicle, comprising:
- a base frame having a pair of mirror image guide rails with a stop at a forward end and a continuous peripheral sealing surface;
- a movable panel slidably attached to the guide rails and configured to substantially cover the opening in a closed position and rearwardly movable above a vehicle roof to an open position, the panel having a sealing surface that substantially conforms to the base frame peripheral sealing surface in the closed position;
- the slidable panel attachment comprising a pair of mirror image slide assemblies on a front panel portion and a pair of mirror image rear brackets on a rear panel portion;
- the rear brackets being pivotably attached to the guide rails; and
- the slide assemblies having a panel raising mechanism comprising a drive slide and a locator disposed within guiderails, and a raising lever disposed between the drive slide and the guide rails and configured to raise the panel to an open position, a closing position, and a sealing position.

* * * * *